United States Patent
Van Rijsewijk (10) Patent No.: US 10,131,459 B2
(45) Date of Patent: Nov. 20, 2018

(54) CONTAINER SLEEVING METHOD AND DEVICE

(71) Applicant: FUJI SEAL INTERNATIONAL, INC., Osaka-shi, Osaka (JP)

(72) Inventor: Lucas Van Rijsewijk, Boxtel (NL)

(73) Assignee: FUJI SEAL INTERNATIONAL, INC., Osaka (JP)

( * ) Notice: Subject to any disclaimer, the term of this patent is extended or adjusted under 35 U.S.C. 154(b) by 1162 days.

(21) Appl. No.: 14/307,212

(22) Filed: Jun. 17, 2014

(65) Prior Publication Data

US 2014/0366487 A1    Dec. 18, 2014

(30) Foreign Application Priority Data

Jun. 17, 2013  (NL) ...................................... 2010994

(51) Int. Cl.
  B65B 57/04 (2006.01)
  B65C 3/14 (2006.01)
  (Continued)

(52) U.S. Cl.
  CPC ............. B65B 57/04 (2013.01); B29C 63/423 (2013.01); B65B 57/06 (2013.01); B65C 3/065 (2013.01); B65B 21/24 (2013.01); B65B 21/245 (2013.01); B65B 57/02 (2013.01); B65C 9/02 (2013.01); B65C 9/40 (2013.01)

(58) Field of Classification Search
  CPC ....... B65B 21/245; B65B 57/02; B65B 57/04; B65B 57/06; B65C 3/065; B65C 9/02; B65C 9/40

USPC .... 53/397, 441, 442, 49, 51, 53, 54, 64, 74, 53/556, 557, 582, 585
See application file for complete search history.

(56) References Cited

U.S. PATENT DOCUMENTS 4,172,873 A * 10/1979 Spicer .................... B65B 53/06
                                                          156/86
4,565,592 A *  1/1986 Wehrmann ........... B29C 63/423
                                                         156/350
(Continued)

FOREIGN PATENT DOCUMENTS

JP     B2-1-60380      12/1989
JP     A-2004-223532    8/2004
(Continued)

OTHER PUBLICATIONS

Written Opinion issued in Dutch Patent Application No. NL2010994 dated Mar. 18, 2014.

*Primary Examiner* — Hemant M Desai
*Assistant Examiner* — Mobeen Ahmed
(74) *Attorney, Agent, or Firm* — Oliff PLC (57) ABSTRACT

The present invention relates to a container sleeving method for arranging sleeves around a plurality of containers, the method includes: transporting an array of containers past a sleeve discharge unit; arranging a sleeve of heat shrinkable foil around a container passing by the sleeve discharge unit by shooting the sleeve from the sleeve discharge unit towards the container; detecting whether the sleeve has been correctly arranged around the container; and, if the sleeve has not been arranged correctly around the container, continue transporting one or more containers along the sleeve discharge unit and discontinue shooting one or more sleeves towards the containers.

10 Claims, 7 Drawing Sheets

(51) Int. Cl.
  *B65B 57/06*   (2006.01)
  *B65C 3/06*    (2006.01)
  *B29C 63/42*   (2006.01)
  *B65B 21/24*       (2006.01)
  *B65B 57/02*       (2006.01)
  *B65C 9/40*        (2006.01)
  *B65C 9/02*        (2006.01)

(56) References Cited

U.S. PATENT DOCUMENTS

| | | | | |
|---|---|---|---|---|
| 4,722,168 | A * | 2/1988 | Heaney | B65B 57/14 |
| | | | | 53/450 |
| 4,872,300 | A * | 10/1989 | Luke | B65B 57/04 |
| | | | | 53/53 |
| 4,944,825 | A * | 7/1990 | Gifford | B65C 3/065 |
| | | | | 156/294 |
| 5,390,477 | A * | 2/1995 | Sowden | B29C 61/02 |
| | | | | 414/153 |
| 6,654,117 | B1 * | 11/2003 | Reading | B67B 3/26 |
| | | | | 356/240.1 |
| 6,684,599 | B1 * | 2/2004 | Fresnel | B65B 9/14 |
| | | | | 53/585 |
| 6,971,217 | B2 * | 12/2005 | Luxem | B65B 57/16 |
| | | | | 198/341.03 |
| 7,322,160 | B2 * | 1/2008 | Herzog | B29C 65/3656 |
| | | | | 53/329.2 |
| 7,832,181 | B2 * | 11/2010 | Schroeder | B07C 5/3404 |
| | | | | 209/657 |
| 9,003,742 | B2 * | 4/2015 | Hahn | B67C 7/0073 |
| | | | | 53/485 |
| 9,278,773 | B2 * | 3/2016 | Arima | B65C 3/065 |
| 2004/0016207 | A1 * | 1/2004 | Lortz | A45D 44/005 |
| | | | | 53/397 |
| 2005/0072510 | A1 * | 4/2005 | Navarro | B29C 63/423 |
| | | | | 156/64 |
| 2007/0017593 | A1 * | 1/2007 | Bernhard | B65C 9/40 |
| | | | | 141/2 |
| 2009/0242097 | A1 * | 10/2009 | Esposito | B65C 9/188 |
| | | | | 156/64 |
| 2010/0037556 | A1 * | 2/2010 | Fresnel | B65B 9/14 |
| | | | | 53/218 |
| 2010/0110197 | A1 * | 5/2010 | Lindner | B65C 9/40 |
| | | | | 348/161 |
| 2010/0152889 | A1 * | 6/2010 | Langosch | B65C 9/06 |
| | | | | 700/230 |
| 2012/0023868 | A1 * | 2/2012 | Pipes | B65B 11/30 |
| | | | | 53/399 |
| 2013/0056148 | A1 * | 3/2013 | Zoni | B65C 9/40 |
| | | | | 156/280 |
| 2013/0061559 | A1 * | 3/2013 | Van Rijsewijk | B29C 63/423 |
| | | | | 53/381.5 |
| 2013/0284346 | A1 * | 10/2013 | Koolhaas | B65C 3/065 |
| | | | | 156/85 |
| 2014/0331600 | A1 * | 11/2014 | Leykamm | B65B 11/004 |
| | | | | 53/397 |
| 2017/0096320 | A1 * | 4/2017 | Zoni | B65C 3/08 |

FOREIGN PATENT DOCUMENTS

WO  WO 2011/031160 A1  3/2011
WO  WO 2011/121732 A1  10/2011

* cited by examiner

CONTAINER SLEEVING METHOD AND DEVICE

The present invention relates to a method, device and system for arranging sleeves around a plurality of containers.

Such system, device and method are disclosed in, for example, the international publication WO 2011031160 A in the name of the same applicant. The sleeving system is aimed at arranging sleeves (labels) around containers, for instance food containers, bottles, bowls, holders, etc. in a fast and reliable manner by feeding a continuous strip of flattened tubular foil material wound around a foil supply reel towards a spreading element, transporting the foil material along the outer surface of the spreading element by a foil drive mechanism so as to open the foil material, cutting the foil material to form sleeves and discharging the sleeves from the spreading element towards a container passing by the spreading element while being transported on a conveyor. The sleeve is applied around the container and the container with the sleeve is transported to an oven in order to heat shrink the sleeve around the container.

Although these known devices are able to transport the containers to an oven and sleeving them while being transported in a reliable manner, sporadically a misapplication may occur, for instance when one or more sleeves become jammed after having left the spreading element. If such misapplication occurs, the device will tend to misapply sleeves on all products to follow on the conveyor. In other words, when one sleeve is not applied correctly on a container, then the next sleeves following the incorrectly applied sleeve will also be misapplied to the following containers. Therefore when a misapplication is detected, both the transport of the foil material along the spreading element and the transport of the containers on the conveyor are stopped. This gives an operator the opportunity to manually remove the misapplied sleeves from the containers. The production is resumed by restarting the conveyor and the foil drive mechanism. The interruption of the production increases the down time of the sleeving system and may increase the total production costs.

In WO 20110121732 A1 a machine is disclosed wherein in case of single sporadic mis-sleevings, the sleeving is continued and the mis-sleeved object is ejected in the following process, while in case of multiple mis-sleevings the sleeving is stopped for adjustment by an operator. However, especially (but not exclusively) when linear conveyors are used, the machine tends to continue mis-sleeving objects once a first mis-sleeving has occurred. This means that in practice the machine is often stopped, resulting in a considerable increase of the down time of the machine.

JP 59209728 A discloses discriminating an accidental failure occurring at random from failures occurring two times or more in succession. When there are multiple failures the machine is stopped to allow maintenance. JP 200311928 A discloses a machine which is entirely stopped depending on the frequency of occurrence of defectively packaging a product, which results in a down time of the machine.

It is an object of the present invention to provide a system, device and method for arranging sleeves around a plurality of containers wherein the above-mentioned drawbacks are removed or at least reduced.

It is a further object of the present invention to provide a system, device and method for arranging sleeves around a plurality of containers wherein a relative short downtime is provided.

At least one of the objects is achieved in a container sleeving method for arranging sleeves around a plurality of containers, the method comprising:
   transporting an array of containers past a sleeve discharge unit;
   arranging a sleeve of heat shrinkable foil around a container passing by the sleeve discharge unit by shooting the sleeve from the sleeve discharge unit towards the container;
   detecting whether the sleeve has been correctly arranged around the container
   if the sleeve has not been arranged correctly around the container, continue transporting one or more containers along the sleeve discharge unit and discontinue shooting one or more sleeves towards the containers.

By continuing transporting containers the containers may take along the misapplied sleeve. i.e. the sleeve that has not been arranged correctly around the first container. In combination with the discontinuation of shooting sleeves towards one or more of the containers to follow, the misapplied sleeve may be removed without being influenced by any further sleeves being shot towards the conveyor. This means that the conveyor can remain operative while the sleeving device is inoperative for only a short while and therefore the downtime of the system is reduced.

The shooting the sleeve from the sleeve discharge unit towards the container may involve shooting the sleeve in a downward direction when the spreading unit is positioned at a higher position than the containers transported on the conveyor. In other embodiments shooting the sleeves is done in an upward direction, i.e. in case the spreading unit is positioned below the containers transported on the conveyor, for instance when the containers are suspended from the conveyor.

The method may further comprise continuing shooting sleeves towards the containers after a preset number of subsequent containers have passed by the sleeve discharge unit. In this embodiment the shooting is restarted after the preset number of containers has passed the sleeve discharge unit. In practical situations the preset number may range from 1 to 20 containers, preferably from 1 to 10, more preferably from 1 to 5 containers, so that the normal operation can be reestablished after only a limited number of containers has passed.

In other embodiments, however, a detection is performed of whether or not the sleeving problem has been resolved. Only if the problem has been resolved, the sleeving of containers is restarted. The number of containers for which the sleeving process is skipped, therefore may vary depending on the results of the detection.

In embodiments of the invention the method comprises:
   detecting whether a sleeve continues to be present in a predefined space between the sleeve discharge unit and the container after the sleeve has been shot towards the container
   if a sleeve continues to be present in the space, determining that the sleeve has not been arranged correctly around the container.

Whether a sleeve continues to be present in the predefined space (herein also referred to as the application space) may be determined by whether the sleeve is present in said space after a preset (first) time interval triggered by shooting the sleeve. If the sleeve is present after this time interval, a sleeve shot error (or, in case of shooting sleeves in a downward direction, a sleeve down error) must have occurred. The preset time interval may be the time interval between consecutive shots. The determination is made when the next sleeve is about to be shot towards the next container.

The method may further comprise:
  detecting whether a sleeve continues to be present in a predefined space between the sleeve discharge unit and the container after a preset number of containers have passed by the sleeve discharge unit;
  if no sleeve is detected, restarting shooting sleeves towards the containers while being transported along the mandrel unit; and
  if presence of a sleeve is detected, stopping the transport of the containers.

The sleeving operation is restarted if the blocking condition is removed and the application space is free to allow passing of further sleeves.

At least one of the above-identified objects may also be achieved in a container sleeving method for arranging sleeves around a plurality of containers, the method comprising:
  transporting an array of containers past a sleeve discharge unit;
  arranging a sleeve around a container passing by the sleeve discharge unit by shooting the sleeve from the sleeve discharge unit towards the container;
  detecting a blocking condition of the sleeve in a space between the mandrel unit and the containers and determining a sleeve shot error exits in case of a detected blocking condition;
  if a sleeve shot error exits, continue transporting containers and stop shooting sleeves towards the containers;
  detecting if a sleeve shot error still exists alter a preset number of containers have passed the mandrel unit;
  if no sleeve shot error exists after the preset number of containers have passed the mandrel unit, restart shooting of sleeves from the sleeve discharge unit to the containers and/or if a sleeve shot error exits after the preset number of containers have passed the mandrel unit, stop transporting the containers past the sleeve discharge unit.

Detecting the presence of a sleeve in the space between the mandrel unit and a container may comprise detecting whether or not a light beam from one or more error sensors, arranged at one or more positions between the discharge unit and the container, is blocked by a sleeve in the space. In other embodiments use is made of one or more cameras, for instance CCD cameras, to determine the presence of a sleeve in the (application) space.

The detecting of a sleeve shot error may comprise measuring the position of a sleeve that has been shot towards a container. The sleeve may also be partially arranged around the container or not even arranged at all around the container (for instance jammed between a previous sleeve and the present container). The position of the sleeve cannot be measured in this case. There is a shot error when the sleeve has the wrong position or a position cannot be measured.

According to an embodiment of the invention the method comprises transporting the containers consecutively along a shooting position at a distance from the stationary sleeve discharge unit. More specifically, the conveyor may be a linear conveyor transporting the containers one-by-one in a row of containers along the sleeving position. The sleeving position is a position below the sleeve discharge unit if the sleeves are shot downward or above the sleeve discharge unit if the sleeves are shot upward.

In further embodiments the method comprises:
  detecting whether a sleeve shot from the sleeve discharge unit has actually been released from the sleeve discharge unit;
  if the sleeve has not been released from the sleeve discharge unit determining that a sleeve jam error has occurred and discontinuing both the transport of containers and the shooting of sleeves.

In case the sleeve is still present on the spreading unit when an attempt has been made to shoot the sleeve to a container and hence if a sleeve jam error has occurred, both the container transport and the sleeve transport are halted.

According to another aspect a container sleeving method for arranging sleeves around a plurality of containers is provided, the method comprising:
  transporting an array of containers past a sleeve discharge unit;
  feeding a film of heat shrinkable foil material towards the sleeve discharge unit;
  arranging sleeves of heat shrinkable foil around containers passing by the sleeve discharge unit by shooting the sleeves from the sleeve discharge unit towards the respective containers;
the method further comprising:
  increasing the speed of feeding the foil material to the sleeve discharge unit from a minimum speed to a maximum speed;
  shooting a first sleeve towards a first container, skipping a first number of containers, shooting a second sleeve towards a second container, skipping a second number of containers, and shooting a third sleeve towards a third container. Herein the second number may be smaller than the first number so that the timing of discharging the sleeves is reduced while the speed of the foil material increases.

Skipping of a continuously diminishing number of containers and shooting sleeves to the containers may be repeated until the maximum speed is reached. This method may be used, for instance, to compensate for the slow start up behavior of the foil material supply (which may be caused by the mass inertia of the foil supply, for instance the foil buffer).

In further embodiments the method may comprise:
  detecting a sleeve error and determining whether a sleeve, a container without sleeve or a sleeved container is to be removed from the conveyor depending on the detected sleeve error;
  removing the sleeve, the container without sleeve or the sleeved container from the conveyor that is determined to be removed from the conveyor.

The detecting a sleeve error may comprise detecting whether a sleeve is present around a container, for instance once it has left the sleeving area below or above the sleeving device. The detection may comprise determining the width of the container at a predefined height. When the width corresponds to the width of the container only, then a sleeve error is present. If the width correspond to the expected width of a sleeved container (i.e. the container plus the sleeve), then this sleeve error this not occur. However, there may be other sleeve errors. For instance, the detecting may comprise detecting the height position of the sleeve. The method may comprise removing the sleeved container if the height is incorrect, for instance because is has only partly been moved over the container. The method may also comprise determining whether the sleeve material on a container contains a splice (for instance an edge or rim of foil material from different reels have been attached to each other) and removing the sleeved container whenever a splice is present and/or determining whether foil material has ended up between two consecutive containers (the sleeve being completely detached from the containers) and removing the foil material whenever this is the case.

According to another aspect a container sleeving device for arranging sleeves around a plurality of containers is provided, the device comprising:
- a conveyor for transporting an array of containers;
- a sleeve discharge unit for arranging a sleeve of heat shrinkable foil around a container passing by the sleeve discharge unit, the discharge unit being arranged so as to shoot the sleeve from the sleeve discharge unit towards the container;
- a detector unit configured to detect whether the sleeve has been correctly arranged around the container and to provide a detection signal representative of the detection;
- a controller communicatively connected to the conveyor, sleeve discharge unit and detector unit for controlling the transporting of the conveyor and the shooting of the sleeve discharge unit based on the detection signal received from the detector unit;

wherein the controller is configured to control the conveyor to continue transporting one or more containers along the sleeve discharge unit and to control the sleeve discharge unit to discontinue shooting one or more sleeves towards the containers if the sleeve has not been correctly arranged around the container.

In embodiments of the invention the controller is configured to control the sleeve discharge unit to continue shooting sleeves towards the containers after a preset number of subsequent containers have passed by the sleeve discharge unit, wherein the preset number preferably ranges from 1 to 20 containers, more preferably from 1 to 10, even more preferably from 1 to 5 containers.

In embodiments of the invention the detector unit and/or controller are configured to detect whether a sleeve continues to be present in a predefined space between the sleeve discharge unit and the container after the sleeve has been shot towards the container and if a sleeve continues to be present in the space, to determine that the sleeve has not been arranged correctly around the container.

In embodiments of the invention the detector unit and/or controller are configured to detect whether a sleeve continues to be present in a predefined space between the sleeve discharge unit and the container after the sleeve has been shot towards the container. The detector unit and/or controller may further be configured to restart shooting sleeves towards the containers while being transported along the mandrel unit if no sleeve is detected, and to stop the transport of the containers if presence of a sleeve is detected.

According to another aspect a container sleeving device for arranging sleeves around a plurality of containers is provided, the device comprising:
- a conveyor for transporting an array of containers;
- a sleeve discharge unit for arranging a sleeve of heat shrinkable foil around a container passing by the sleeve discharge unit, the discharge unit being arranged so as to shoot the sleeve from the sleeve discharge unit towards the container;
- a detector unit configured to detect a blocking condition of the sleeve in a space between the mandrel unit and the containers and to provide a detection signal representative of the detection;
- a controller communicatively connected to the conveyor, sleeve discharge unit and detector unit for controlling the transporting of the conveyor and the shooting of the sleeve discharge unit based on the detection signal received from the detector unit;

wherein the controller is configured to determine a sleeve shot error exits in case of a detected blocking condition, the controller being further configured to continue transporting containers and stop shooting sleeves towards the containers if a sleeve shot error exits, to detect if a sleeve shot error still exists after a preset number of containers have passed the mandrel unit and to restart shooting of sleeves from the sleeve discharge unit to the containers if no sleeve shot error exists after the preset number of containers have passed the mandrel unit and/or to stop transporting the containers past the sleeve discharge unit if a sleeve shot error exits after the preset number of containers have passed the mandrel unit.

In embodiments of the invention the detector unit comprises at least one error sensor, arranged at a position between the mandrel unit and the container, to detect the presence of a sleeve in a space defined between the mandrel unit and the container. The error sensor may be an optical sensor or a camera, for instance.

In further embodiments the detector unit and controller are configured to:
- detect whether a sleeve shot from the sleeve discharge unit has actually been released from the sleeve discharge unit; and to
- discontinue both the transport of containers and the shooting of sleeves if the sleeve has not been released from the sleeve discharge unit.

Further characteristics of the present invention will be elucidated in the accompanying description of various preferred embodiments thereof. In the description reference is made to the annexed figures, that show.

Figure 1:
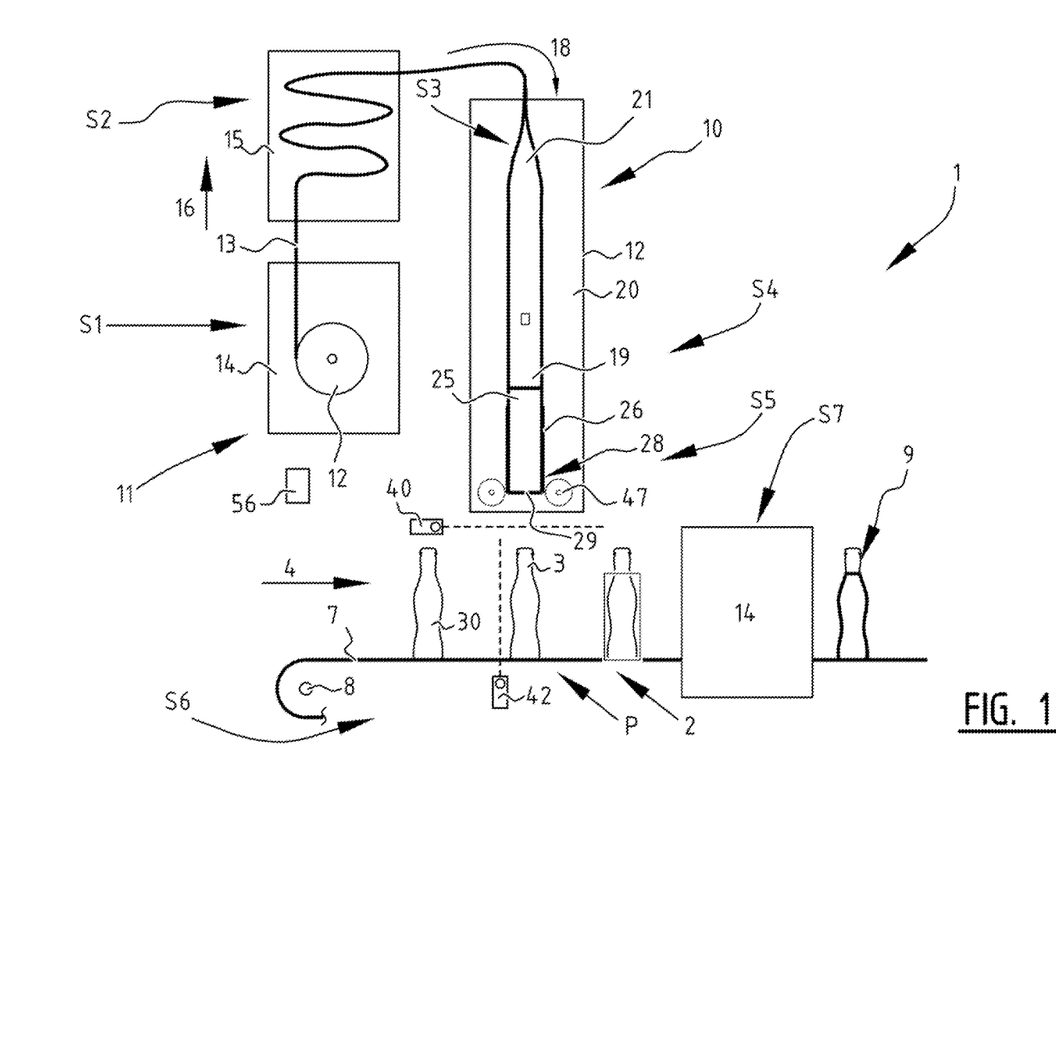
FIG. 1 a schematic overview of a sleeving system according to an embodiment of the present invention.

FIG. 1 schematically shows an embodiment of a sleeving system 1 for sleeving (labeling) containers. The sleeving system 1 comprises a conveyor 2 (only partly shown in the figure) for conveying one or more parallel rows of containers 30, for instance food containers, bottles and the like, in a direction 4 along a sleeving position (P) at which sleeves are arranged around the containers. Embodiments of the conveyor may comprise an endless transport belt 7 to be conveyed by suitable wheels 8 in the direction 4. However, other types of conveyors may be employed as well. In fact, conveyor 2 may be any type of conveyor capable of transporting an array of containers along the sleeving position.

In the embodiment shown in FIG. 1 the containers 30 are arranged on top of the belt 7. The conveyor 2 may be configured to transport the containers 30 in a discontinuous manner (i.e. intermittently). In preferred embodiments, however, the conveyor is arranged to transport the containers in a continuous manner (i.e. non-intermittently). In these embodiments the operation of arranging of sleeves around the container is performed on the fly and essentially without interrupting the transport of the containers.

FIG. 1 also shows a stationary sleeving device 10 arranged above the sleeving position (P) and configured to arrange sleeves of foil material around containers transported by the conveyor 2. Sleeves are formed by cutting a continuous strip of foil material configured as a flattened tube or envelope at a suitable length. In the present application "sleeve" may be used as an indication for the individual pieces of foil that are arranged around products, but may equally well refer to the foil or strip forming a flattened or opened tube before it is cut.

Preferably the foil material is of a type that shrinks when it is subjected to heat. As explained later, the heat shrinkable foil may be applied around the container and then attached by heat-shrinking the foil onto the container.

FIG. 1 further shows a sleeve supply 11 for supplying a continuous strip of sleeve-like foil material 13 to the sleeving device 10. The sleeve supply 11 comprises a foil stock 14 in which one or more of supply reels 12 are arranged. On each of the supply reels 12 a continuous strip of sleeve-like foil material 13 has been wound. The strip of foil material can be transported towards the sleeving device 10 (direction 16) by any suitable means, for instance several sets of wheels or rollers (not specifically shown in the figures). The foil material of a selected one of the supply reels 12 is transported (S1) towards a foil buffer 15. The foil buffer is arranged to buffer (S2) the supplied foil material to allow for variations in operating speed of the supply without the need to interrupt the sleeving process. In an embodiment the foil stock 14 comprises a splicer (not shown) which is configured to connect a new strip of foil material from a further roll to the end of strip of foil material of an old reel to allow for a continuous feed of foil material to the sleeving device 10. Due to the splicer and the foil buffer 15 the supply of foil material to the sleeving device 10 can be essentially continuously (i.e. in an uninterrupted manner).

The supplied foil material 13, which has a flattened tubular shape, is caused to move (direction 18) along a spreading element 19, herein also referred to as the "mandrel" of the sleeving device 10. The spreading element 19 is configured to spread (S3) the flattened foil material to an "open" position and to cut the foil material to a specific length so that foil material forms consecutive sleeves. A sleeve is sized to be arranged around the container 30 passing below the spreading unit 19. Securing the sleeve to the container may involve gluing or, preferably, a heat shrinking process.

As described above the sleeving device 10 comprises a spreading element 19 (which may be comprised of a plurality of parts). The spreading element 19 is suspended from a stationary frame 20 and is configured for spreading the strip of foil (which initially has a flattened tubular form) to an open position. To this end the spreading element 19 is provided with a spear or tip 21 shaped to open the foil 13 delivered as a flat envelop of foil material. For instance, the spear 21 may have a substantially flat cross section at the upstream end and more or less circular cross section at the downstream end thereof to bring the foil material to the desired tubular envelope or sleeve shape.

Sleeving device 10 further comprises a cutting unit 25 for cutting (S4) of sleeves from the opened foil material 13. The foil material may be guided past the cutting means unit for cutting the foil material at certain intervals so as to obtain individual sleeve-like foil envelopes or sleeves 26 of a suitable length. The sleeving device 10 also comprises a discharge unit 28, for instance comprising a pair of opposing inner guide wheels mounted at the bottom end 29 of the spreading element 19 and a pair of outer drive wheels (which may be driven by a suitable electric motor, not shown in the figures) mounted at the frame 20, for shooting (S5) sleeves 26 cut from the strip of foil material towards the containers passing by the sleeving device. If the timing of discharging is correct and the containers are more or less aligned with the spreading element 19 the sleeves may be correctly arranged around the containers.

Once a sleeve 26 has been formed by the cutting unit 50, ejected (S5) towards the container 30 by the discharge unit 28 and arranged around the container by having the sleeve slide downwardly along the top end 3 of the container 30, the combination of sleeve 26 and container 30 is conveyed (S6) further in direction 4 by conveyor 2. Conveyor 2 transports the sleeved containers further downstream, e.g. into a heated steam oven 14 (schematically shown in FIG. 1). In the oven 14 the sleeve 26 may be heat shrunk (S7) so that the sleeve 26 is permanently attached to the container 30, providing a labeled container 9. In a subsequent step a drying process may be applied.

Advantages of a system set up according to FIG. 1 are high speed, accuracy, reliability and reduced space. Not only sleeves are provided at high speed using the discharge unit, but also the heat shrinking in the oven is executed quickly, limiting the actual heating of the container that could already contain the product such as a dairy product. The illustrated system also allows handling of thin foils of less than 60 μm.

Figure 2:
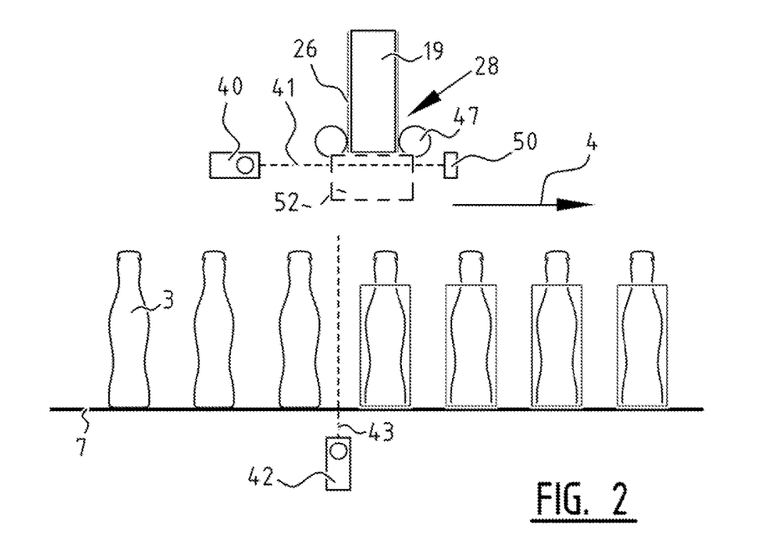
FIG. 2 a schematic side view of an embodiment of the sleeving device and conveyor according to the invention, when sleeves are correctly applied to the containers.
Figure 7:
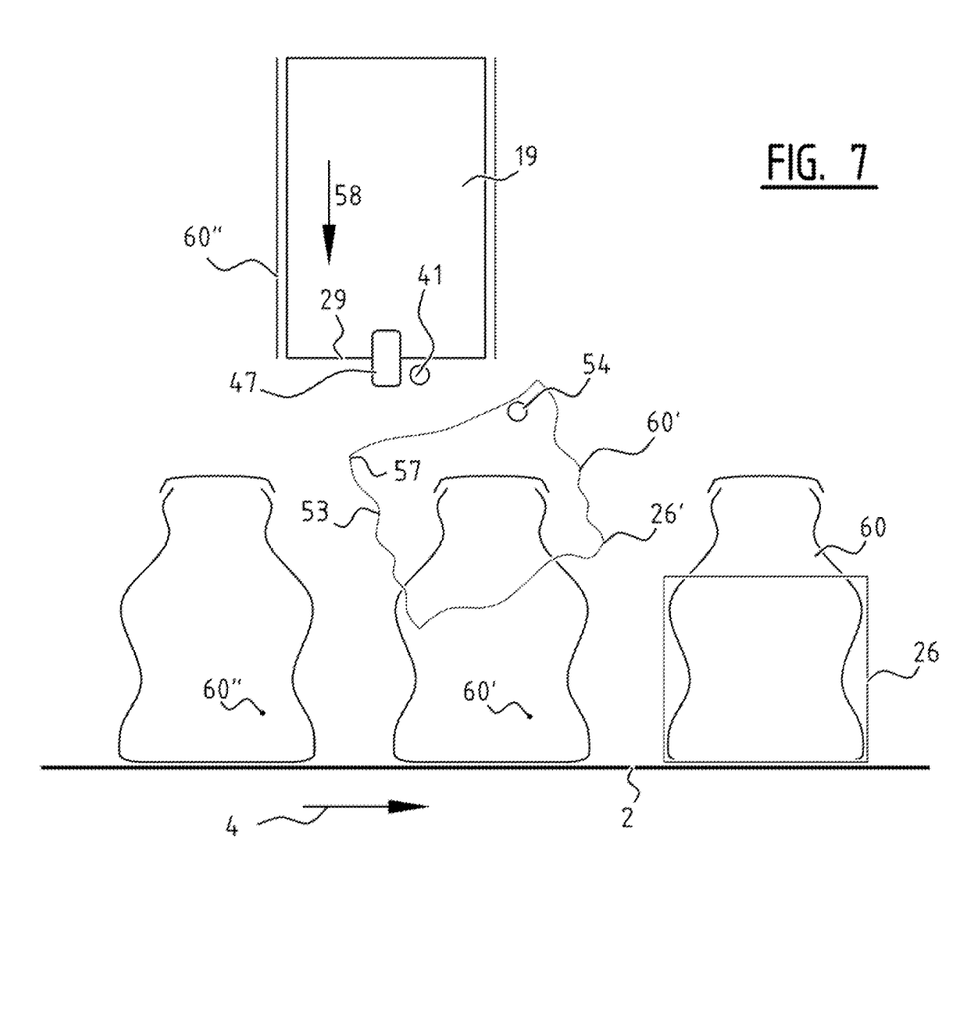
FIG. 7 a schematic side view of a further embodiment of the present invention.

FIG. 2 schematically shows an embodiment wherein at the bottom end 29 of the spreading element 19 and slightly below the drive wheels 47 of the discharge unit 28 an error sensor 40 of a detection unit is arranged. In other embodiments wherein the drive wheels 47 extend partially below the bottom end 29 of the spreading unit, the error sensor is arranged just below the bottom end, sideways of the drive wheels 47. An example of this arrangement is illustrated in FIG. 7. The error sensor 40 may be embodied as a light emitting device for emitting a horizontal beam 41 of (laser) light towards a reflector 50 mounted at the frame 20 at the same height as the light emitting device. The sensor also comprises a light detector which is arranged to detect the light reflected from the reflector 50. When there is no object (sleeve) interrupting the light beam 41, the sensor detects the light reflected from the reflector. If, however, a sleeve is present in the application space 52 between the bottom end 29 of the spreading element 19 and the upper portion of the containers 30 passing by the sleeving device 10, the presence of the sleeve is detected since the light beam 41 is interrupted and the sensor does not detect any light reflected from the reflector 50.

FIG. 2 also shows a start sensor 42 configured to detect the presence of a container 30 on the conveyor 2 at the imaginary line 43 before the sleeving position of the container. The start sensor 42 may be of a similar type as the error sensor 40. The start sensor 42 may be arranged to emit vertical light beam towards a reflector (not shown) positioned above the conveyor. In other embodiments the start sensor 42 is positioned at one side of the conveyor and configured to emit a horizontal light beam towards a reflector (not shown) arranged at the opposite side of the conveyor. Depending on whether a containers is present, the light beam is interrupted or is reflected back towards the sensor.

Referring to FIG. 1 a suitable controller 56 is connected to operate the sleeving device 10 (for instance, the discharge unit 28, cutting unit 25, etc.), the sleeve supply 11, the conveyor 2, the sensors 40,42 and the oven 14. More specifically, the controller 56 is configured to synchronize the ejecting of the sleeves with the transport of the containers and to detect whether the sleeves have been correctly arranged around each of the containers.

A number of different errors may occur when sleeving the containers with the system described so far. For instance, if the error sensor 40 is not triggered during a sleeving cycle (i.e. the time interval for arranging one sleeve around one container), i.e. of the light beam 41 is not temporarily interrupted even though the sleeving device 10 has been instructed by the controller 56 to eject a sleeve towards a container, the sensor 40 and/or the controller 56 determines that a sleeve jam error has occurred. A sleeve jam error may be caused by a piece of foil material (sleeve) to be stuck on the spreading element 19, the cutting unit 25 to malfunction, etc. If a sleeve jam error has occurred, the system 1 comprising the conveyor 2, sleeving device 10 and the sleeve supply 11 is halted and the system remains under repair until the jam error has been solved.

Another type of errors that may be detected by the sensor 40 and/or controller 56 is a sleeve down error. When the controller 56 has instructed the sleeving device 10 to discharge a sleeve since the arrival of a container 30 on the conveyor 2 has been detected by the start sensor 42 and the presence of a sleeve in the application space 52 has been detected by the error sensor 40, the situation may occur that the sleeve somehow keeps being present in the application space 52. For instance, while the sleeve should be present in the application space 52 for a predetermined maximum time interval (for instance, a couple of milliseconds while travelling towards the container 30), a sleeve down error may be determined when the sleeve remains in the application space 52 longer than the maximum time interval. For instance, a sleeve down error is detected when the sensor 40 is blocked once the next sleeve on the spreading element 19 is about to start its motion.

Figure 3:
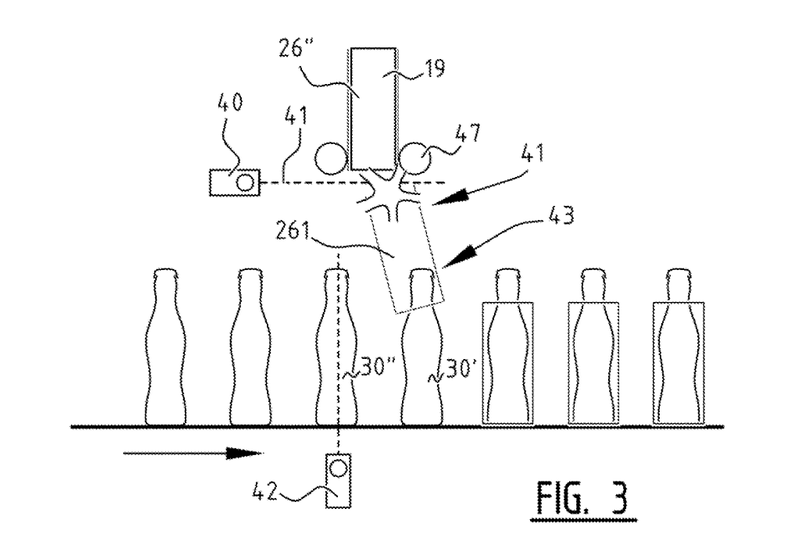
FIG. 3 a schematic side view of the embodiment of FIG. 2, in case of a sleeve down error.

When a sleeve down error occurs because a sleeve has not been applied correctly onto a container, the risk of a next sleeve being jammed is high. Referring to FIG. 3, when for instance a sleeve 26' for a container 30' is incorrectly arranged around the container, the next sleeve 26" for the next container 30" may be shot against the first sleeve 26' so that the next sleeve cannot be arranged correctly around the next container. This situation may be repeated for further containers and generally the controller needs to shut down the system, i.e. stop at least the conveyor 2 and the sleeving device 10. Then an operator may need to manually remove the jammed sleeves and the system is started up again to resume the sleeving process.

Figure 4:
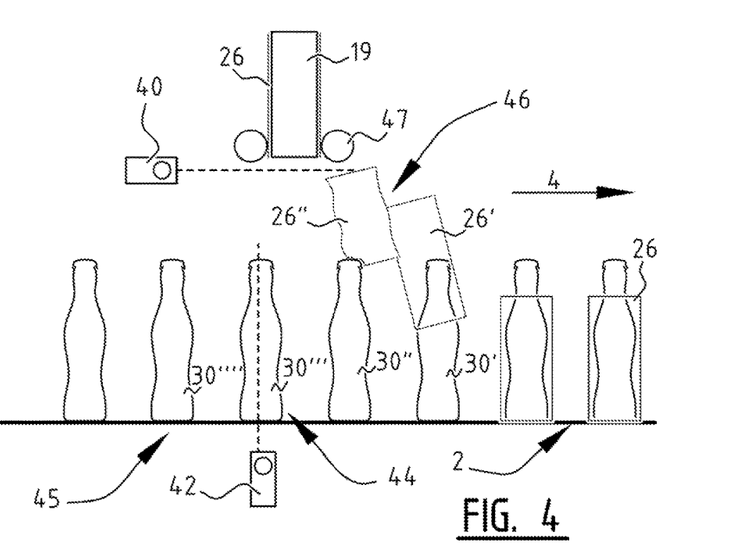
FIG. 4 a schematic side view of the embodiment of FIGS. 2 and 3, in case of a continuing sleeve down error.

However, the inventors have found that in many cases the sleeves 26 that that are causing a jam are pulled away from the spreading element 19 by the moving containers 30. According to an embodiment of the invention the controller 56 is configured to maintain the transportation of the containers 30 on the conveyor and temporarily stop the discharge of sleeves towards the containers. This is illustrated in FIG. 4. In this figure is shown that two jammed sleeves 26',26" are moving away from the sleeving device 10 due to movement of the containers 30', 30". More specifically, the sleeving device 10 remains inactive and allows one or more containers 30''',30'''' to pass the sleeving position (P) without having the sleeving device 10 discharge sleeves towards these containers. When after one or more containers have passed the sleeving position (P) no sleeve remains in the application space 52, the sensor 40 and/or controller 56 determines that the sleeve jam error condition does not exist anymore. The sleeving process is then restarted and production is continued. In this embodiment the conveyor 2 does not need to be stopped and production continues after one or more containers have passed since the jam error has been detected. This may reduce the down time of the sleeving system and increase the overall sleeving process. When after one or more containers have passed the sleeving position and the application space 52 is still (partly) occupied by a foil material (of one or more sleeves), the controller 56 may determine that in this specific situation the pulling away of jammed sleeves by subsequent containers has not worked properly. The controller 56 then stops the sleeving system 1 (i.e. the conveyor 2, the sleeving device 10 already been halted). An operator may remove the jammed sleeves manually and/or a suitable removal mechanism is actuated to remove the jammed sleeves automatically.

Alternatively or additionally, a sensor may be provided to measure the position of a sleeve 26 at the sleeving area (around position (P)) and to determine based on the sensed position, whether the sleeving result is sufficient to allow a next sleeve to be arranged around the next container. This sensor may be camera, such as a CCD camera, connected to the controller 56 and configured to detect the occurrence of a sleeve jam error and the subsequent removal of the sleeve jam error (as result of further containers pulling one or more jammed sleeves away from the sleeving area.

FIG. 7 is a side view showing the bottom end 29 of the spreading element 19, the drive wheels 47 of the discharge unit, the conveyor 2 with a number of containers 60, 60', 60" transported in direction 4, and the error sensor 40. The position of the sensor 40 projecting the horizontal light beam 41 onto the reflector 50 is chosen such that the detection of a sleeve down error can be correctly performed for many of the different sizes and shapes of the spreading unit (for instance, tapered or non-tapered spreading unit or mandrel). Generally, replacing a spreading unit by a spreading unit of different size and/or shape does not require any displacement of the error sensor 40. In other words, one sensor may be sufficient to cover a sufficiently large application space 52. However in some cases, for instance in case of a very large mandrel, a tapered mandrel (tapered is a mandrel with a non-cylindrical shape), or in case the distance between the end of the spreading unit and the conveyor (and the container positioned on the conveyor) is relatively large, one or more additional sensors distributed along the application space 52 might be needed. FIG. 7 shows one of the possible positions of an additional sensor 54.

Referring to FIG. 7, a first sleeve 26 has been correctly arranged around a container 60. A second sleeve 26' has not been applied correctly and remains partly arranged around the container 60' in an oblique manner as a result of the movement of the container 60'. Even though the sleeve is not correctly arranged around the container, the original error sensor 40 is no longer blocked and no sleeve down error would be detected by the error sensor 40 alone. If the application of sleeves continues the next sleeve 60" ejected downward (in direction 58) may collide with the upper left corner 57 of the sleeve 60'. To avoid this situation the additional, second sensor is positioned somewhere below the bottom end 29 of the spreading element 19. A sleeve down error is then determined if at least one of the sensors 40,54 is blocked by one or more of the sleeves.

Figure 8:
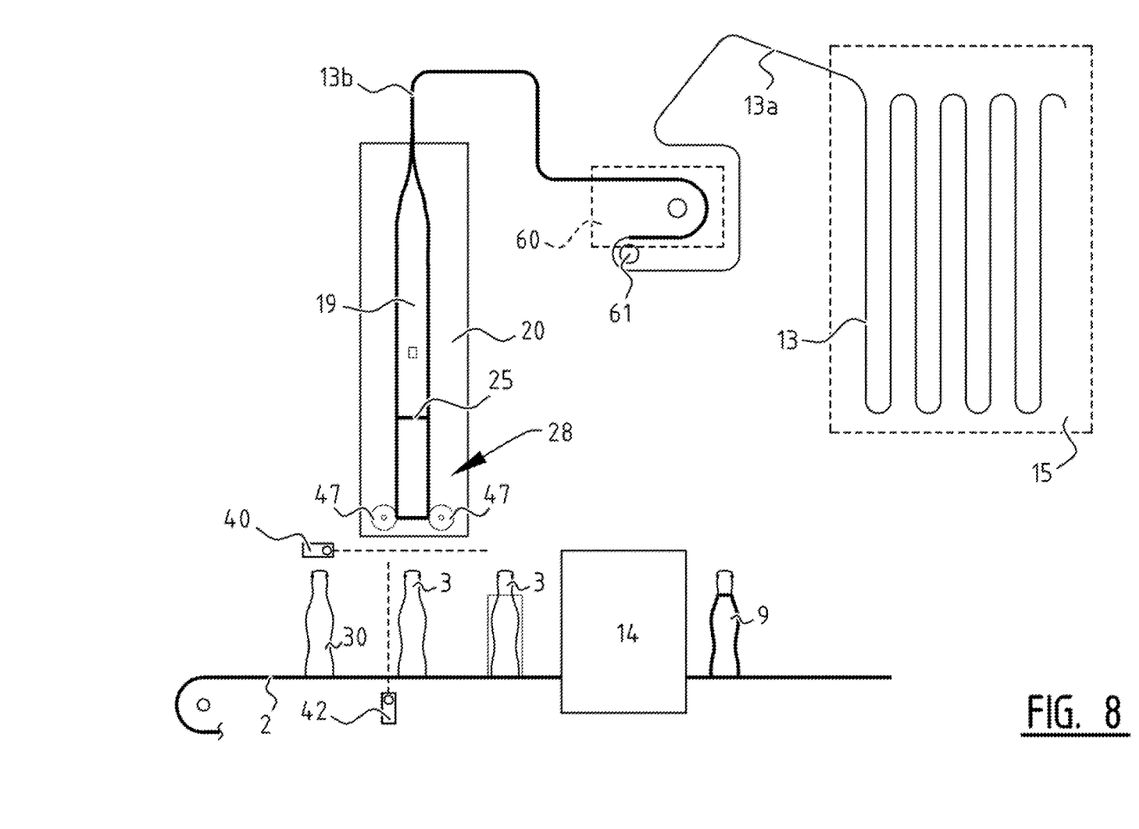
FIG. 8 a schematic overview of a still further embodiment of the invention.

FIG. 8 schematically shows a further embodiment of a sleeving system for sleeving (labeling) containers. Unless indicated otherwise the further sleeving system corresponds to the embodiment described in connection with FIG. 1. Throughout the figures the same or similar reference numbers have been applied for both sleeving systems. As discussed above and according to embodiments of the invention one or more containers 30 may be skipped in the sleeving process depending on whether or not a sleeve has left the application space 52 and can no longer cause application errors. More specifically, in the embodiment of FIG. 1 the one or more containers are skipped after a after a sleeve down error has been detected. This enables the containers to move the jammed sleeves away from the sleeving position (P) so that the application space 52 becomes free again to sleeve the next containers. However, if more than a minimum number of containers are skipped and the sleeving device 10 interrupts the discharge of foil material towards the containers for a continued amount of time, the foil buffer 15 stops supplying film 13 to the sleeving device 10. The speed of the foil material then becomes low or even zero. When the controller 56 decides that the sleeving device 10 may continue sleeving (i.e. applying sleeves to the products transported on the conveyor 2), the sleeving device 10 starts sleeving the products at full speed. This is needed since the containers 30 are already at full speed. In others words, a ramping up of the sleeve supply that takes place when the system normally starts, is not possible when the sleeving device is restarted after a sleeve down error. Due to its mass inertia the start up of the foil buffer 15 is likely to be insufficiently fast to accommodate for the speed of the containers on the conveyor 2. This may lead to the situation that not enough film material is transported to the spreading element 19 of the sleeving device 10, causing the entire system including the conveyor 2 to be forced to stop.

In order to accommodate to a certain extent the speed variation of the foil material, an additional buffer 60 may be added to the foil buffer 15. The additional buffer 60 has a mass which is substantially lower than the foil buffer 15 so that there is a reduced mass inertia during start-up of the system. The additional buffer 60 may be a relatively small buffer with a motor driven roller 61 that pulls the foil material 13 out of the foil buffer 15. The additional buffer provides more time to get the film buffer 15 up to speed.

Referring to FIG. 8, the portion 13b of the foil material 13 (from vacuum buffer 60 to the spreading unit) undergoes the default start and stop behaviour of the foil material required for foil transport along the spreading unit and cutting the foil material by the cutting unit 25. Portion 13a of the foil material 13 (from the foil buffer 15 to the vacuum buffer 60) preferably has an essentially constant speed (due to mass inertia of the buffer).

In case of very high conveyor speeds when the use of the additional buffer may not be sufficient or in case no additional buffer is used, for instance when the use of a buffer is not possible for practical reasons or when the costs of the additional buffer are not acceptable, alternative measures need to be taken to properly sleeve the containers at high speed. In addition to the additional buffer or instead of the additional buffer the controller 56 may therefore be configured to deliberately keep skipping a container 30 in order to get the speed of the foil buffer 15 up to the desired operating speed again. If, for instance, the sleeving system is operating at a conveyor speed of 800 containers per minute (i.e. container conveyor operating speed is 800 cpm) and the sleeve application process is restarted after a misapplication (i.e. after a sleeve down error has occurred), the controller 56 may have the sleeving device 10 skip three containers (therefore running at 25% of its maximum foil buffer operating speed), apply a sleeve and then skip two containers (=0.33%), apply a sleeve and then skip every other container (=50%) (and apply a sleeve on the other container) and finally skip no more containers (=100% foil buffer operating speed). This way the foil buffer operating speed of the supplying foil material by the foil buffer 15 may slowly increase until the desired maximum operating speed (usually the supply speed of the foil material before the sleeve down error occurred) has been reached.

Figure 5:
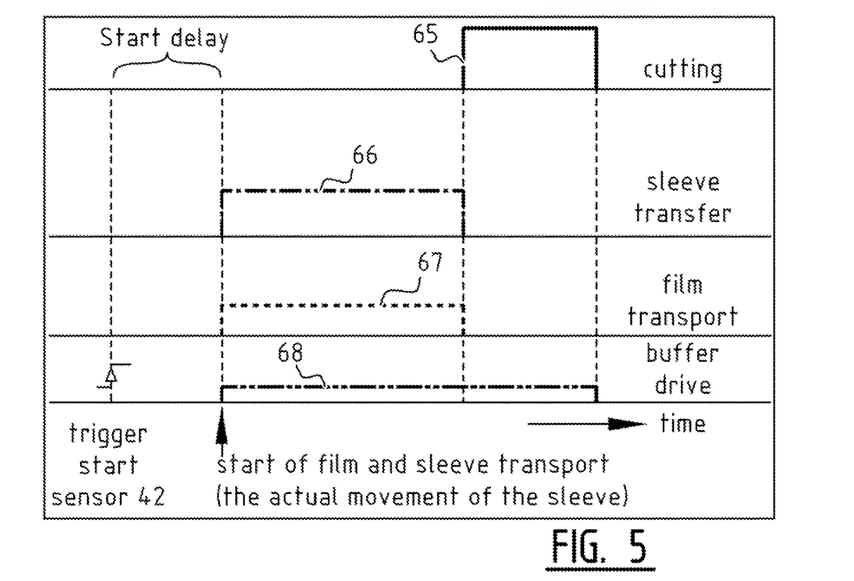
FIGS. 5 and 6 timing diagrams showing control signals as a function of time.
Figure 6:
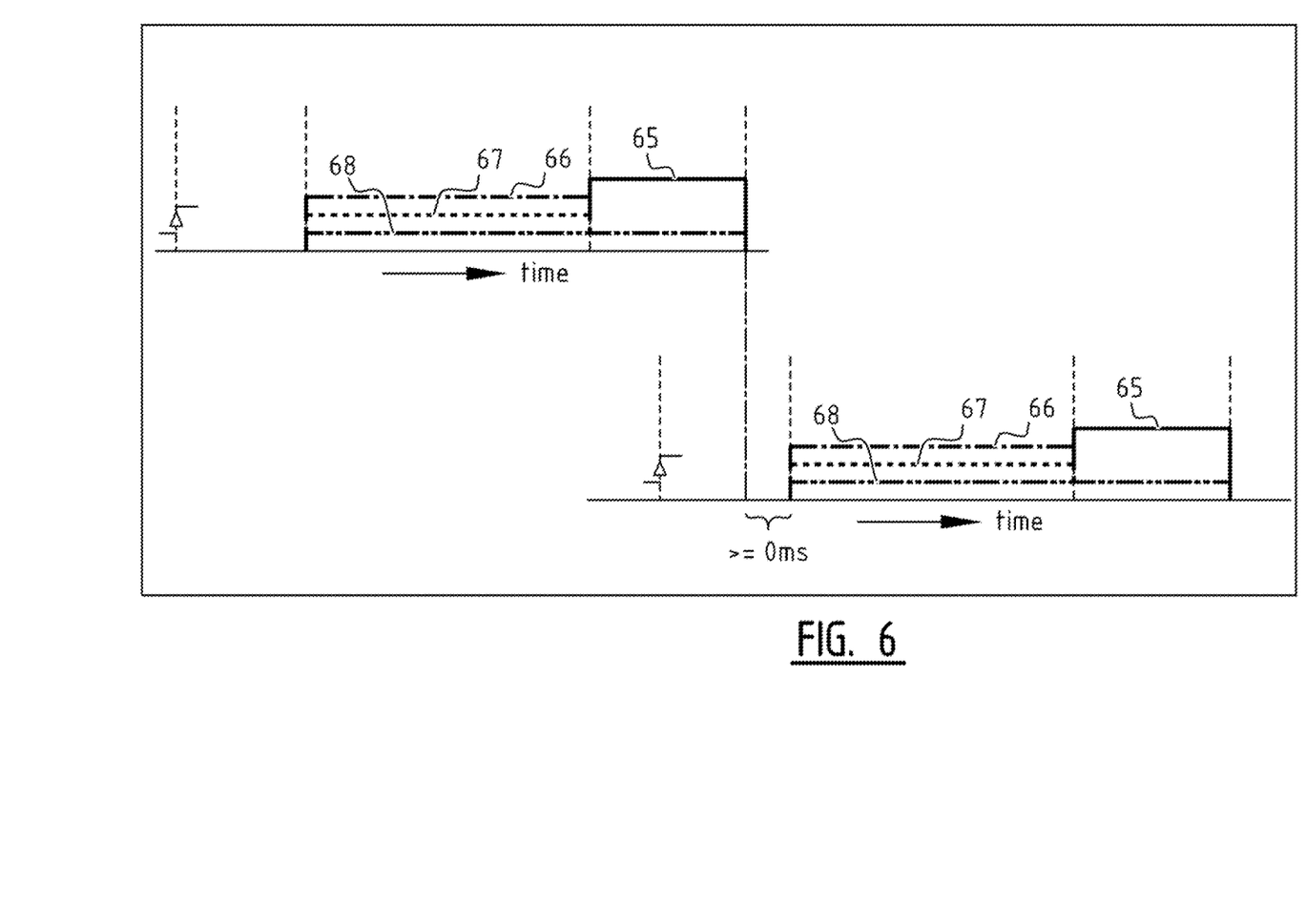

FIGS. 5 and 6 are timing diagrams illustrating the timing of control signals from the controller 56, more specifically the control signal 65 from the controller to the cutting unit 25 for cutting the foil material, the control signal 66 to the discharge unit 28 for transporting the foil towards a container, the control signal 67 to the transport rolls (not shown) between the foil buffer 15 and the spreading element 19 and the control signal 68 to the transport means of the foil buffer 15 for transporting the foil material. The X-axis (abscissa) represents the time, while the Y-axis represents the respective amplitudes of the individual control signals.

FIGS. 5 and 6 show a cycle for a single container. An application cycle starts once the start sensor 42 is activated by the passing of a container 30. After a preset startup time delay (for instance, a start up delay of several ms or less), the drive motor of the discharge unit 28 (sleeve transfer), the drive motor of the spreading unit drive rolls (mandrel drive) and the drive motor of the foil buffer 15 (buffer drive) start simultaneously. After the foil transport is completed the foil material is cut. When a new start signal is received before the current application cycle is finished, the preset startup time delay for the new application cycle is started. Foil transport for the new cycle will only start if the cutting cycle of the previous cycle is finished. If this is not the case, the transport will not be started, and the start signal will be ignored resulting in an unsleeved product.

Figure 9:
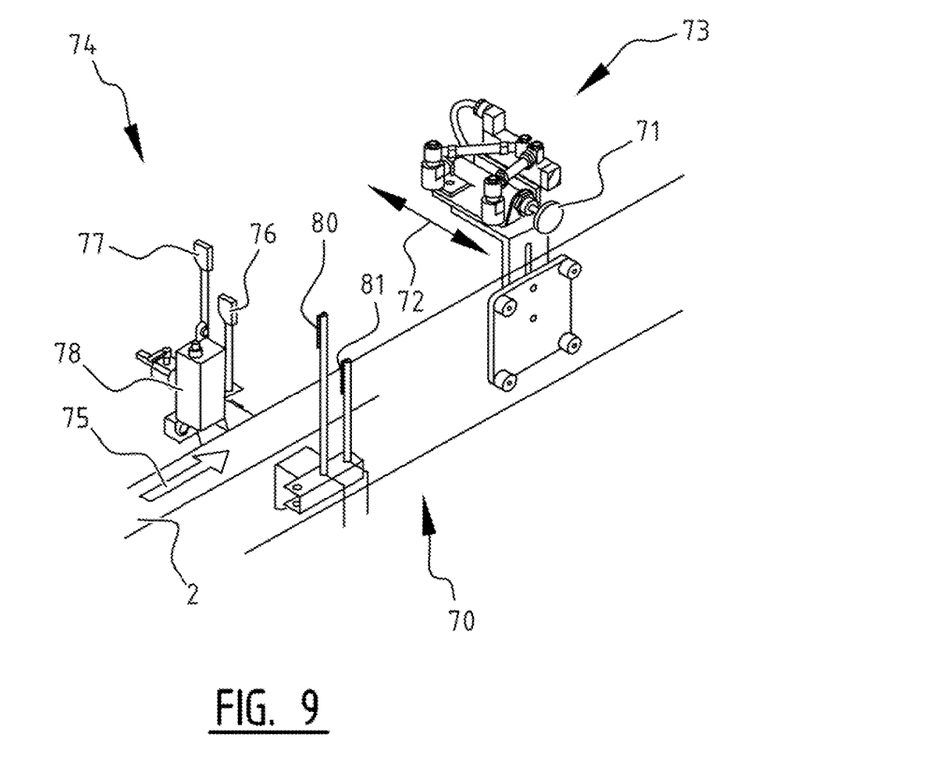
FIG. 9 a schematic overview of an embodiment of a detection unit and a removal unit for removing sleeves, containers without sleeves and/or sleeved containers from the conveyor.

Referring to FIG. 9 which shows a further embodiment of the present invention, an (optional) inspection unit 70 may be provided to inspect whether a sleeve is correctly applied to the containers and to remove any ill-sleeved containers from the conveyor 2. The inspection unit 70 is arranged in an area between the sleeving device 10 and the heat oven 14 (of FIG. 1). The inspection device 70 comprises a removal unit 73 connected to the controller 56. The removal unit 73 is configured to remove ill-sleeved containers from the conveyor 2 at the moment these containers pass by. To this end the removal unit 73 comprises a removal element 71. In embodiments of the present invention the removal element 71 is movable in a reciprocating manner in a direction 72 perpendicular to the transport direction 75 of the containers so that containers (with or without a sleeve) can be pushed one by one from the conveyor surface.

FIG. 9 also shows a detection unit 74 connected to the controller 56. The detection unit 74 may be pan of the above-mentioned detection unit (comprising sensor 40, etc.) or may be a separate detection unit. The detection unit 74 checks whether a sleeve is applied on a container and if it is positioned correctly on the container. If this is not the case, the container is rejected (which means that it is to be removed). The detection unit 74 comprises a sleeve presence detector 76. The sleeve presence detector may be a combination of a light source configured to direct a light beam towards a light sensor 81 and is able to detect whether the container passing by the detector has been provided with a sleeve. For instance, the detector measures the width of the passing container (and sleeve) and compares this to a reference value in order to determine if the container has to be rejected. Alternatively or in addition to the sleeve presence detector 76 the detection unit 74 may comprise sleeve height detector 77 comprising a light source and a light sensor 80. If a sleeve has been arranged around a container the sleeve height detector 77 may detect whether the sleeve has been positioned correctly (i.e. at the required position) on the container. Alternatively or in addition to the sleeve presence detector 76 and/or the sleeve height sensor 77, the detection unit 74 may be provided with a splice detector 78 for detecting whether the sleeve arranged around the container contains a splice.

Several types of misapplication of sleeves may occur. In a first type of misapplications the sleeve is stuck to the container, for instance because a drop of water or another liquid is present on the outer surface of the container which may cause too much friction for the sleeve to be slid over the container surface. In a second type of misapplications the sleeve is hampered by a previous sleeve because the previous sleeve has not been correctly arranged around the container, for instance because the previous sleeve has not been slid sufficiently far over the container or the sleeve is misapplied (corresponding to the first type of misapplications) but the sleeve still manages to be arranged around the upper part of the container (in which situation the sleeve may be folded and cannot be pushed further downward). In a third type of misapplication the situation of the second type occurs, but the sleeve is not maintained on the container. The sleeve may for instance end up between consecutive container or elsewhere on the conveyor.

If a misapplication according to the first or second type occurs, this may be detected by the detection unit 74. The detection unit 74 and/or the controller 56 then instruct the removal unit 73 to reject the specific sleeve(s) and remove them from the conveyor by pushing the containers sideways using the rejection element 71. If a misapplication of the third type occurs, this may be detected by the detection unit 74 as well. The detection unit may comprise one or more further optical sensors and/or a camera (for instance, a CCD camera) to detect the presence of a sleeve between the containers. Upon detection of such sleeves the detection unit may send an actuation signal to a sleeve removal device to actuate the same. This device is arranged downstream of the detection unit and upstream of the oven and is configured to remove the sleeve from the conveyor. The sleeve removal device, for instance a blower configured to blow high-pressure (compressed) air towards the sleeve during a small time interval (i.e. the time interval between passing of two containers), then causes the sleeve to be removed from the conveyor and to prevent the sleeve to enter the heat oven.

In other embodiments of the invention the sleeve removal device may remove the sleeves without needing the actuation signal. For instance, the sleeve removal device may comprise a blower configured to provide a continuous low-pressure air flow in the direction of the conveyor to push the sleeves from the conveyor.

The present invention is not limited to the embodiments thereof described herein. The rights sought are defined by the following claims, within the scope of which numerous modifications can be envisaged.

The invention claimed is:

1. A container sleeving method for arranging sleeves around a plurality of containers, the method comprising:
transporting the plurality of containers past by a sleeve discharge unit;
shooting a plurality of sleeves of heat shrinkable foil from the sleeve discharge unit towards respective containers of the plurality of containers;
arranging a sleeve of the plurality of sleeves shot by the sleeve discharge unit around a containers transported past by the sleeve discharge unit;
detecting whether the sleeve has been correctly arranged around the container; and
if the sleeve has not been arranged correctly around the container, continuing transporting one or more subsequent containers of the plurality of containers by the sleeve discharge unit and discontinuing shooting one or more sleeves of the plurality of sleeves towards the containers.

2. The container sleeving method as claimed in claim 1, further comprising, if the sleeve has not been arranged correctly around the container, resuming shooting one or more sleeves towards the containers after a preset number of the subsequent containers have passed by the sleeve discharge unit.

3. The container sleeving method as claimed in claim 1, wherein detecting whether the sleeve has been correctly arranged around the container includes detecting whether the sleeve continues to be present in a predefined space between the sleeve discharge unit and the container after the sleeve has been shot towards the container; and
if the sleeve continues to be present in the space, determining that the sleeve has not been arranged correctly around the container.

4. The container sleeving method as claimed in claim 1, further comprising:
when the sleeve has not been arranged correctly around the container, detecting whether the sleeve continues to be present in a predefined space between the sleeve discharge unit and the container after a preset number of containers have passed by the sleeve discharge unit;
if the sleeve is not detected, restarting shooting sleeves towards the containers and continuing passing one or more containers by the sleeve discharge unit; and
if presence of the sleeve is detected, discontinuing transporting the containers.

5. A container sleeving method for arranging sleeves around a plurality of containers, the method comprising:
transporting the plurality of containers past a sleeve discharge unit having a mandrel;
shooting a plurality of sleeves of heat shrinkable foil from the sleeve discharge unit towards respective containers of the plurality of containers;
arranging a sleeve around a container of the plurality of containers passing by the sleeve discharge unit by shooting the sleeve from the sleeve discharge unit towards the container;
detecting a blocking condition of the sleeve in a space between the mandrel and the container and determining whether a sleeve shot error exists in case of a detected blocking condition;
if a sleeve shot error exists:
  (i) continuing transporting containers and discontinuing shooting sleeves towards the containers,
  (ii) then detect if a sleeve shot error still exists after a preset number of containers have passed by the mandrel,
  (iii) if no sleeve shot error exists after the preset number of containers have passed by the mandrel, restarting shooting of sleeves from the sleeve discharge unit to the containers, and
  (iv) if the sleeve shot error exits after the preset number of containers have passed by the mandrel, discontinuing transporting the containers.

6. The container sleeving method as claimed in claim 5, wherein detecting the blocking condition of the sleeve in the space between the mandrel and the container includes detecting whether or not a light beam from one or more error sensors, arranged at one or more positions between the discharge unit and the container, is blocked by the sleeve in the space.

7. The container sleeving method as claimed in claim 5, wherein detecting of the sleeve shot error includes measuring a position of the sleeve shot towards the container.

8. The container sleeving method as claimed in claim 1, wherein the plurality of containers are transported consecutively past by the sleeve discharge unit at a shooting position located at a predetermined distance from the sleeve discharge unit.

9. A container sleeving method as claimed in claim 1, wherein detecting whether the sleeve has been correctly arranged around the container includes detecting whether the sleeve shot from the sleeve discharge unit is released from the sleeve discharge unit, and if the sleeve is not released from the sleeve discharge unit, determining that a sleeve jam error has occurred and discontinuing the transport of the containers and the shooting of the sleeves towards the containers.

10. The container sleeving method as claimed in claim 9, wherein detecting whether the sleeve is released from the sleeve discharge unit includes detecting whether the sleeve is in a predefined space between the sleeve discharge unit and the container.

\* \* \* \* \*